Dec. 30, 1952　　　A. R. VIGLIOTTI　　　2,623,537
FLOAT CONTROLLED VALVE ASSEMBLY
Filed March 21, 1950　　　　　　　　　2 SHEETS—SHEET 1
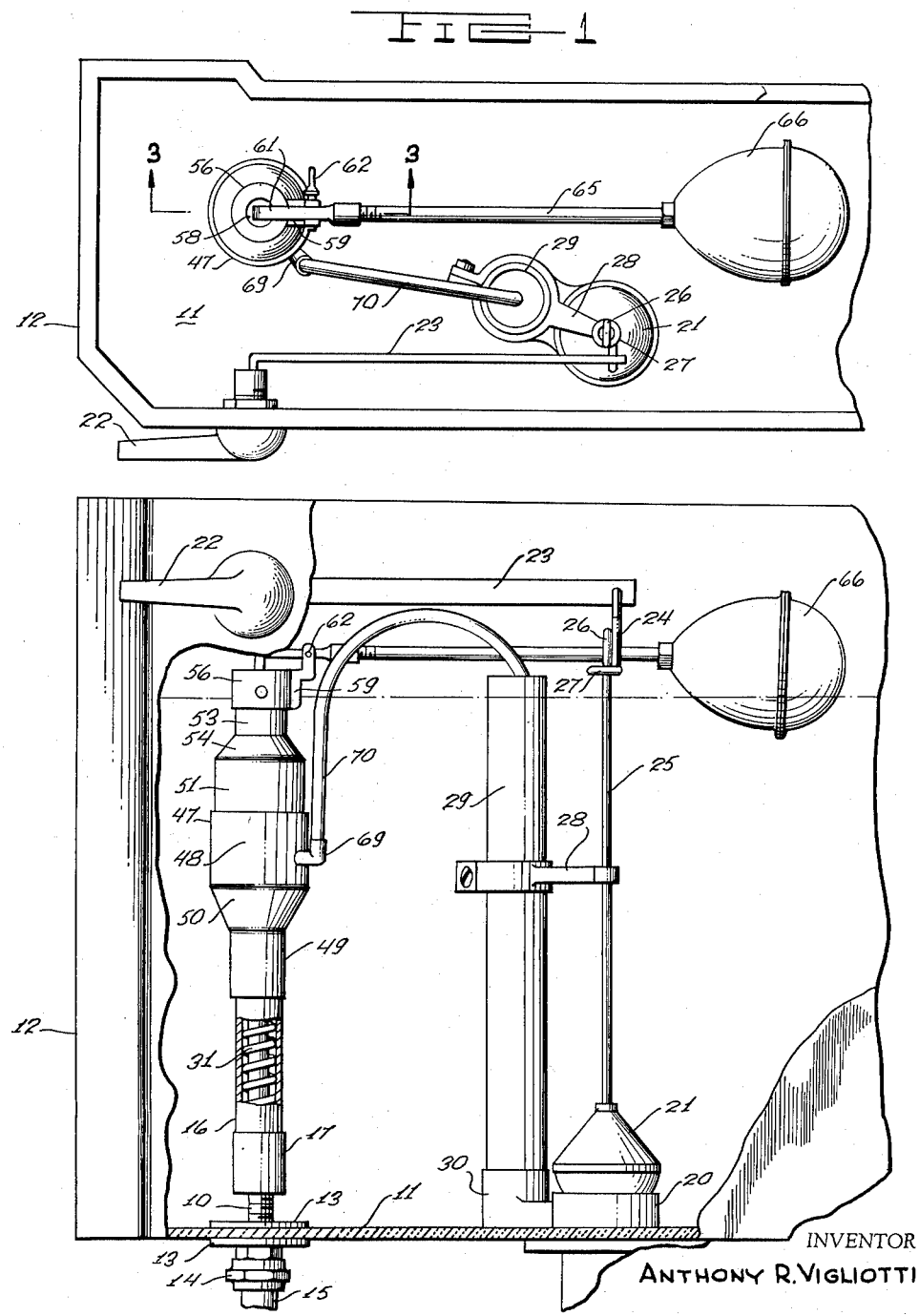
INVENTOR
ANTHONY R. VIGLIOTTI
BY
McMorrow, Berman & Davidson
ATTORNEYS

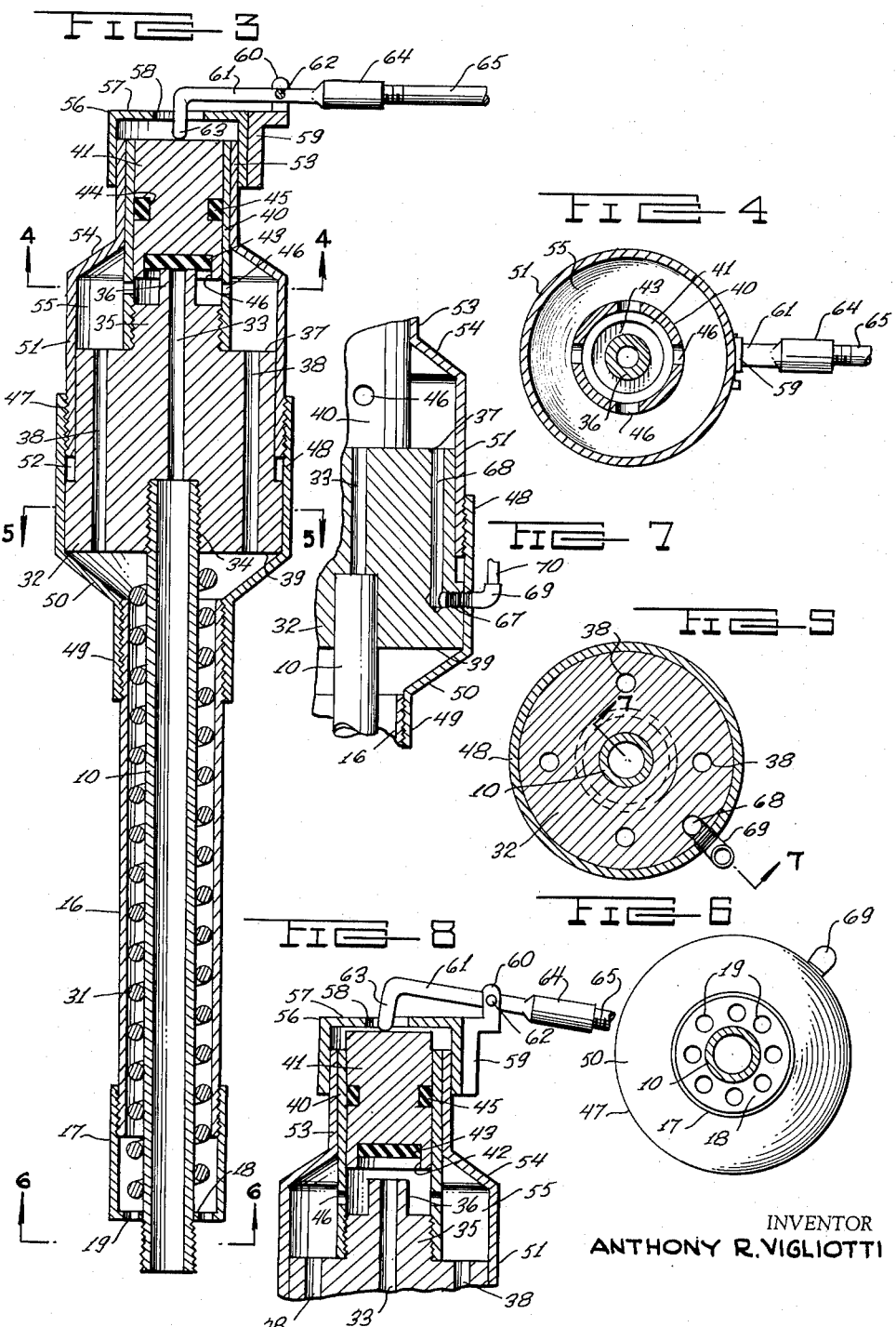

Patented Dec. 30, 1952

2,623,537

UNITED STATES PATENT OFFICE 2,623,537

FLOAT CONTROLLED VALVE ASSEMBLY

Anthony R. Vigliotti, Westbury, N. Y.

Application March 21, 1950, Serial No. 150,894

1 Claim. (Cl. 137—437)

This invention relates to float controlled valve assemblies and more particularly to a valve assembly to be mounted in a toilet flush tank to control the flow of water into the tank.

It is among the objects of the invention to provide an improved float controlled valve assembly which can be mounted in an existing flush tank in replacement of the float controlled valve assembly originally provided, with no modification of the tank structure, and which can utilize the same float originally provided, which effectively silences the water being admitted to the tank and prevents splashing of the water and reduces turbulence of the water in the tank to an extent such that the turbulence does not interfere with the proper seating of the ball or flush valve, which effectively eliminates water hammer noise and vibration when the valve closes and will effectively handle a wide range of water pressures, which is highly efficient and positive in operation, and which is simple and durable in construction, economical to manufacture, easy to service, and not subject to malfunctioning in use.

Other objects and advantages will become apparent from a consideration of the following description and the appended claim in conjunction with the accompanying drawings wherein:

Figure 1 is a top plan view of a flush tank with flushing and tank filling mechanism therein including a float controlled valve assembly illustrative of the invention;

Figure 2 is a front elevational view of the tank and mechanism illustrated in Figure 1, the front wall of the tank being broken away to show the mechanism and a portion of the mechanism being broken away and shown in cross section to better illustrate the construction thereof;

Figure 3 is a longitudinal medial cross sectional view on an enlarged scale of the float controlled valve assembly of the present invention and is taken substantially on the line 3—3 of Figure 1;

Figure 4 is a transverse cross sectional view on the line 4—4 of Figure 3;

Figure 5 is a transverse cross sectional view on the line 5—5 of Figure 3;

Figure 6 is a transverse cross sectional view on the line 6—6 of Figure 3;

Figure 7 is a cross sectional view of a fragmentary portion of the float controlled valve assembly taken on the line 7—7 of Figure 5; and Figure 8 is a cross sectional view similar to Figure 3 of the upper portion of the float controlled valve assembly showing the parts in a different operative position from that illustrated in Figure 3.

With continued reference to the drawings, the valve assembly of the present invention comprises a water inlet pipe 10 secured at one end to the bottom wall 11 of the flush tank 12 by the clamp flanges 13 and connected by a union 14 with a water pressure line 15 below the bottom wall of the tank.

The water pipe 10 stands in a substantially vertical position in the tank and water admitted to the tank flows upwardly through this pipe from the pressure line 15.

A cylindrical sleeve 16 circumspatially receives the intermediate portion of the pipe 10 and this sleeve is provided with external screw threads at its opposite ends. A cylindrical ferrule 17 receives the lower end of the sleeve 16 and is provided at one end with internal screw threads which receive the external screw threads at the lower end of the sleeve. At its opposite end the ferrule 17 is provided with an end wall 18 which end wall is provided with a central opening through which the inlet pipe 10 extends and with a plurality of apertures 19 smaller than the opening 18 and surrounding the latter. The end wall of the ferrule 17 is positioned adjacent the bottom wall 11 of the tank, as is clearly illustrated in Figure 2, and water entering the tank flows through the small apertures 19 so that the stream of water flowing into the tank is diffused and the velocity of the water decreased to prevent splashing and minimize turbulence caused by the flow of water into the tank.

As the flush valve seat 20 is located on the tank bottom 11 adjacent the water inlet pipe 10, excessive turbulence created in the water in the tank by the admission of water into the tank through the float controlled valve interferes with the operation of the ball valve 21 and frequently prevents the ball valve from seating properly on the flush valve seat 20 after the toilet has been flushed.

The ball valve 21 is raised to flush the toilet by a manually operated handle 22 rotatably mounted in the front wall of the tank near the upper end of the latter and connected to one end of a lever 23, the other end of which is connected to the ball valve 21 by a link 24 pivotally connected at one end to the distal end of the lever 23 and slidably engaging a stem 25 which is secured at its lower end to the ball valve 21 and is provided at its upper end with an eye 26 engageable by a loop 27 on the end of the link to raise the ball valve when the handle 22 is moved in the proper direction. The stem 25 is slidably received in a guide 28 mounted on the overflow pipe 29 intermediate the length of the latter, the vertically disposed overflow pipe being secured at its lower end in a fitting 30 which projects outwardly from the flush valve seat 20.

As the flush valve mechanism is of well known construction, a detailed description thereof is considered unnecessary for the purposes of the present disclosure.

A helical element 31 is disposed in and extends through the space between the water inlet pipe 10 and the sleeve 16, this element being in the form of a helical spring the coils of which extend entirely across the space between the sleeve and the water inlet pipe so that water flowing through this space to the apertures 19 is forced to travel in a helical path. This arrangement retards the rush of water through the sleeve 16 and silences the flow of water through the float controlled valve into the flush tank.

A cylindrical block 32 is mounted on the upper end of the water inlet pipe 10 and is provided with a central bore 33 extending therethrough and an internally screw threaded counterbore 34 at one end of the bore 33 which counterbore receives the screw threaded upper end of the pipe 10.

A valve seat formation is provided on the upper end of the block 32, that is, the end opposite that receiving the adjacent end of the pipe 10, and this formation comprises an externally screw threaded boss 35 which is coaxial with the bore 33 and extends outwardly from the corresponding end of the block and a second boss 36 which is also coaxial with the bore 33 and is of materially smaller diameter than the boss 35 and extends outwardly from the outer end of the latter. The outer end of the boss 36 is shaped and smoothed to provide a valve seat.

The lower end of the block 32 lies substantially in a plane perpendicular to the axis of the bore 33 and the upper end of the block includes an annular surface or shoulder 37 surrounding the boss 35 and disposed in a plane perpendicular to the axis of the bore 33 and parallel to the plane of the lower end of the block.

The bore 33 comprises a water inlet bore or passage and four water outlet bores or passages 38 extend from the annular surface 37 to the bottom end surface 39 of the block and these outlet passages are spaced apart at substantially equal angular intervals around the bore 33 and are spaced outwardly from the boss 35.

A valve cylinder 40 is provided at one end with internal screw threads and is threaded at such one end onto the externally screw threaded boss 35. This cylinder extends outwardly of the outer end of the valve seat boss 36 and a cylindrical valve piston 41 is slidably mounted in the cylinder 40 and is substantially flush at its outer end with the outer end of the cylinder when the valve is closed, as illustrated in Figure 3.

The piston 41 is provided in its end adjacent the valve seat boss 36 with a circular recess 42 and a circular disc 43 of a suitable gasket material, such as rubber or fibre, is disposed in the recess 42 and contacts the outer end of the boss 36 when the valve is closed, to cut off the flow of water through the bore 33. Intermediate its length the piston 41 is provided with an annular groove 44 of rectangular cross sectional shape and a sealing ring 45 of suitable material, such as rubber or leather, is mounted in the groove 44 and contacts the inner surface of the cylinder 40 to prevent leakage of water past the valve piston. The cylinder 40 is provided with angularly spaced apart holes or ports 46 therein which open to the space within the cylinder surrounding the boss 36 of reduced diameter and disposed at the outer end of the boss 35, for the passage of water flowing into this annular space from the bore 33 to the exterior of the cylinder 40 when the valve is opened.

A two part housing 47 receives the block 35 and this housing comprises a lower part including a cylindrical portion 48 receiving the lower portion of the block and a cylindrical portion 49 of smaller diameter than the portion 48 and receiving the upper end of the sleeve 16, the portions 48 and 49 being connected at their adjacent ends by a conical shoulder 50. The portion 49 of the lower part of the housing is internally screw threaded to receive the external screw threads at the upper end of sleeve 16 and the portion 48 is internally screw threaded at its end remote from the portion 49 to receive external screw threads on the block receiving cylindrical portion 51 of the upper part of the two part housing. The portion 51 of the upper part of the housing is smaller in diameter than the portion 52 of the lower portion of the housing so that the upper portion 51 can be threadedly received in the open end of the lower part of the housing and the block 32 is externally relieved around its upper portion, as indicated at 52, to receive the cylindrical portion 51 of the upper part of the housing. The upper part of the housing further comprises a cylindrical portion 53 which is of smaller diameter than the portion 51 and receives the valve cylinder 40 at a location spaced from the adjacent end of the block 32 and terminates flush with the outer end of the valve cylinders. The portions 51 and 53 of the upper part of the housing are connected by a conical shoulder 54 which is spaced from the annular surface 37 of the block 32, as is clearly indicated in Figure 3 to provide an annular space 55 surrounding the ported portion of the valve cylinder 40.

The space 55 extends above the holes or ports 46 in the valve cylinder to provide an air chamber which effectively cushions any hammer action due to sudden changes in the velocity of water flowing through the valve assembly.

A flange cap 56 is secured to the housing portion 53 and has an end wall 57 which overlies and is spaced from the outer end of the cylinder 40 and is provided with a central aperture 58. An angle bracket 59 is secured to one side of the cap 56 and provided with a pair of upstanding apertured lugs 60 and a float actuated lever 61 is disposed between and pivotally connected to the lugs 60 by a pivot pin 62 and is provided at one end with an angularly disposed portion 63 which extends through the aperture 58 and bears on the outer end of the piston 41. The other end of the lever 61 is provided with a screw threaded socket 64 which receives the adjacent end of the float arm 65.

The usual float 66 is mounted on the other or outer end of the arm 65 and is effective to operate the lever 61 to force the piston 41 downwardly in the cylinder 40 and bring the gasket 43 against the end of boss 36 when the float is raised to its normal cut off position by a body of water in the tank 12.

A screw threaded aperture 67 extends through the housing portion 48 and through the adjacent portion of the block 32 to the lower end of a bore 68 which extends downwardly through the block from the annular surface 37. An elbow fitting 69 is threaded into the aperture or tapped hole 67 and a small tube 70 extends from the elbow fitting 69 into the upper end of the overflow pipe 29 to supply a limited quantity of water to the overflow pipe while the tank is filling, this water flowing downwardly through the overflow pipe and the flush valve seat 20 into the trap of a toilet bowl on which the tank 12 is mounted.

In the operation of the device, when the ball valve 21 is raised by the handle 22 and the water runs out of the tank 12 through the flush valve seat 20, the float 66 is lowered permitting the piston 41 to rise in the cylinder 40 until the gasket 43 is displaced above the upper end of the valve seat boss 36. Water will then flow through the water inlet pipe 10 and the bore 33 to the end of the boss 36 and from the end of the boss into the annular space surrounding this boss and thence through the apertures 46 in the valve cylinder into the annular space 55. From the space 55 the water will flow downwardly through the bores 38 in the block 32, a small quantity of the water flowing through the bore 36 and tube 70 into the overflow pipe. As explained above, the air cushion provided in the space 55 prevents the rush of water through the apertures 46 from producing a hammer effect in the valve housing when the valve is suddenly opened. From the bores 38 the water flows into the space within the conical shoulder 50 at the lower end of the valve housing and from this space into the helical passage provided by the element 31 in the space between the water inlet pipe 10 and the sleeve 16. The water flows downwardly and around the helical passage provided by the element 31 and into the ferrule 17 from which it flows through the apertures 19 into the tank near the bottom wall of the tank, without splashing or material turbulence, as explained above. As the water rises in the tank it raises the buoyant float 66 until, at a location slightly below the maximum desired level of the water in the tank the portion 63 of lever 61 contacts the upper end of the valve piston 41 and, as the water rises to the desired level, the piston 41 is forced downwardly to bring the gasket 43 into engagement with the upper end of boss 36 and close the valve, this valve closing action being positive and occuring in a short interval of time so that any hissing or humming noise occasioned by water flowing through a restricted passage between the valve seat and the valve gasket is reduced to an inconsequential interval or substantially eliminated.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A float controlled valve assembly comprising a water inlet pipe, a sleeve circumspatially receiving said pipe, a ferrule receiving one end of said sleeve and having an end wall provided with an aperture receiving said pipe near one end of the latter, said ferrule having a plurality of orifices therein for discharging water therefrom, a helical element extending through the space between said pipe and said sleeve constraining water flowing through such space to follow a helical path, a block secured at one end on the other end of said pipe and having on its other end a valve seat formation, said block having a first bore extending from said other end of said pipe through said valve seat formation and at least one other bore extending therethrough at a location spaced from said first bore, a valve cylinder secured at one end to said block surrounding said valve seat formation and extending outwardly of the latter, a valve piston slidable in said cylinder and engageable at one end with the outer end of said valve seat formation to close the valve, a cap secured on the other end of said cylinder and having an aperture therein, a float operated lever pivotally mounted on said cap and extending through said aperture into engagement with said piston to force said piston into engagement with said valve seat formation, and a housing receiving said block and having end portions of reduced diameter one of which receives said sleeve at the end of the latter adjacent said block and the other of which receives said cylinder at the end of the latter remote from said block, said cylinder having holes therein within said housing and said housing constraining water flowing from said water inlet pipe through said first bore in the block and through the cylinder holes when said piston is displaced from said valve seat formation, to flow through said other bore in the block and into the space between said water inlet pipe and said sleeve.

ANTHONY R. VIGLIOTTI.

REFERENCES CITED

The following references are of record in the file of this patent:

UNITED STATES PATENTS

| Number | Name | Date |
| --- | --- | --- |
| 1,497,796 | Sherwood | June 17, 1924 |
| 2,003,380 | Masterson | June 14, 1935 |
| 2,088,864 | McGrath | Aug. 3, 1937 |
| 2,277,878 | Morris | Mar. 31, 1942 |
| 2,290,145 | Owens | July 14, 1942 |
| 2,374,989 | Funk | May 1, 1945 |
| 2,382,500 | Owens | Aug. 14, 1945 |
| 2,390,134 | Scirsky | Dec. 4, 1945 |
| 2,426,782 | Mazzeo | Sept. 2, 1947 |